US007519924B2

(12) United States Patent
Bocking et al.

(10) Patent No.: US 7,519,924 B2
(45) Date of Patent: Apr. 14, 2009

(54) HANDHELD ELECTRONIC DEVICE INCLUDING APPOINTMENT AND MEETING CONFLICT NOTIFICATION, AND ASSOCIATED METHOD

(75) Inventors: Andrew D. Bocking, Waterloo (CA); Darrell R. May, Waterloo (CA); Michael T. Hardy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 535 days.

(21) Appl. No.: 10/980,402

(22) Filed: Nov. 3, 2004

(65) Prior Publication Data

US 2006/0095859 A1    May 4, 2006

(51) Int. Cl.
*G06F 3/048* (2006.01)
(52) U.S. Cl. .................. 715/963; 345/340; 715/764
(58) Field of Classification Search ........... 364/400; 368/28; 701/204; 714/1; 715/764
See application file for complete search history.

(56) References Cited

U.S. PATENT DOCUMENTS

| 4,415,271 | A | * | 11/1983 | Mori ........................... 368/41 |
| 4,626,836 | A | * | 12/1986 | Curtis et al. ................. 345/156 |
| 5,023,851 | A | * | 6/1991 | Murray et al. ................ 368/41 |
| 5,070,470 | A | * | 12/1991 | Scully et al. ............... 708/112 |
| 5,247,438 | A | * | 9/1993 | Subas et al. .................. 700/90 |
| 5,311,423 | A | * | 5/1994 | Clark ............................ 705/8 |
| 5,519,606 | A | * | 5/1996 | Frid-Nielsen et al. .......... 705/9 |
| 5,745,110 | A | * | 4/1998 | Ertemalp ..................... 715/764 |
| 5,761,525 | A | | 6/1998 | Williams |
| 5,774,867 | A | | 6/1998 | Fitzpatrick et al. |
| 5,778,346 | A | * | 7/1998 | Frid-Nielsen et al. .......... 705/9 |
| 5,790,974 | A | * | 8/1998 | Tognazzini .............. 455/456.5 |
| 5,855,006 | A | * | 12/1998 | Huemoeller et al. ........... 705/9 |
| 5,877,753 | A | * | 3/1999 | Takenaka .................... 345/551 |
| 5,960,406 | A | * | 9/1999 | Rasansky et al. .............. 705/9 |
| 6,144,371 | A | * | 11/2000 | Clary et al. ................. 345/173 |

(Continued)

FOREIGN PATENT DOCUMENTS

JP    10021198 A  *  1/1998

OTHER PUBLICATIONS

"Sams Teach Yourself Microsoft Outlook 2000 in 10 Minutes", by Joe Habraken, published by Sams Publishing in 1999, pp. c, i, ii, 145, 146, 151-154.*

*Primary Examiner*—Doug Hutton
*Assistant Examiner*—Gregory A DiStefano
(74) *Attorney, Agent, or Firm*—Philip E. Levy; Brij K. Agarwal; Eckert Seamans Cherin & Mellott, LLC (57) ABSTRACT

A method of checking a new entry in a calendar application having a cache that includes a first subset of existing entries falling within a first date range. Also, an electronic device implementing the method. The method includes determining whether the date of the new entry falls within the first date range. If so, the method determines whether the new entry directly conflicts with or is adjacent to one of the existing entries in the first subset, and provides a notification if appropriate. If the date is outside the first date range, the method creates a new calendar cache including a second subset of existing entries falling within a second date range around the new entry date, determines whether the new calendar entry directly conflicts with or is adjacent to one of the existing calendar entries in the second subset, and provides a notification if appropriate.

16 Claims, 5 Drawing Sheets

U.S. PATENT DOCUMENTS

| | | | |
|---|---|---|---|
| 6,279,000 B1* | 8/2001 | Suda et al. | 707/10 |
| 6,781,920 B2* | 8/2004 | Bates et al. | 368/10 |
| 2001/0054072 A1 | 12/2001 | Discolo et al. | |
| 2002/0154178 A1 | 10/2002 | Barnett et al. | |
| 2003/0093706 A1* | 5/2003 | Cronin | 714/1 |
| 2003/0103415 A1 | 6/2003 | Bates et al. | |
| 2003/0204474 A1* | 10/2003 | Capek et al. | 705/64 |
| 2004/0064355 A1* | 4/2004 | Dorenbosch et al. | 705/9 |
| 2005/0039142 A1* | 2/2005 | Jalon et al. | 715/823 |
| 2005/0065832 A1* | 3/2005 | Virta | 705/8 |
| 2006/0047557 A1* | 3/2006 | Bieselin et al. | 705/9 |
| 2006/0067280 A1* | 3/2006 | Howard et al. | 370/337 |
| 2006/0136241 A1* | 6/2006 | De Vries | 705/1 |
| 2007/0219842 A1* | 9/2007 | Bansal et al. | 705/9 |

* cited by examiner

```
┌─────────────────────────────────────┐ ─12
│      NEW APPOINTMENT                │
├─────────────────────────────────────┤
│ Subject: Appointment                │
│ Location: Room B                    │
├─────────────────────────────────────┤
│ ☐ All Day Event                     │
│                                     │
│ Start:       Wed, Nov3,2004  12:00PM│
│ End:         Wed, Nov3,2004  1:00PM │
│ Duration:           1 Hour  0 Mins  │
│ Time Zone:      Eastern Time (-5)   │
│ Reminder:                  15 Mins  │
│ Invited:                            │
│                                     │
├─────────────────────────────────────┤
│ Recurrence:                   None  │
├─────────────────────────────────────┤
│ Notes:                              │
└─────────────────────────────────────┘
```

*FIG.4*

```
┌─────────────────────────────────────┐ ─12
│      NEW APPOINTMENT                │
├─────────────────────────────────────┤
│ Subject: Appointment                │
│ Location: Room B                    │
├─────────────────────────────────────┤
│ Conflicts with another appointment  │  ⎫
│ on your calendar                    │  ⎬ 60
├─────────────────────────────────────┤  ⎭
│ ☐ All Day Event                     │
│                                     │
│ Start:       Wed, Nov3,2004  12:00PM│
│ End:         Wed, Nov3,2004  1:00PM │
│ Duration:           1 Hour  0 Mins  │
│ Time Zone:      Eastern Time (-5)   │
│ Reminder:                  15 Mins  │
│ Invited:                            │
│                                     │
└─────────────────────────────────────┘
```

*FIG.5*

```
Meeting Request                          ⎤-12
From: jsmith@xyzcompany.com
Subject: Meeting
Location:  Room B
Conflicts with another appointment  ⎤
on your calendar                    ⎦ 60

Start:       Wed, Nov 3, 2004  12:00PM
End:         Wed, Nov 3, 2004   1:00PM
Duration:          1 Hour  0 Mins
Time Zone:       Eastern Time (-5)
Invited:     mjones@xyzcompany.com Notes:
```

*FIG. 6*

```
NEW APPOINTMENT                          ⎤-12
Subject: Appointment
Location: Room B
Adjacent to another appointment on  ⎤
your calendar                       ⎦ 65

☐ All Day Event

Start:       Wed, Nov 3, 2004  12:00PM
End:         Wed, Nov 3, 2004   1:00PM
Duration:          1 Hour  0 Mins
Time Zone:       Eastern Time (-5)
Reminder:                 15 Mins
Invited:
```

*FIG. 7*

| Meeting Request | |
|---|---|
| From: jsmith@xyzcompany.com Subject: Meeting Location: Room B | |
| Adjacent to another appointment on your calendar | } 65 |
| Start: Wed, Nov 3, 2004 12:00PM End: Wed, Nov 3, 2004 1:00PM Duration: 1 Hour 0 Mins Time Zone: Eastern Time (-5) Invited: mjones@xyzcompany.com | |
| Notes: | |

FIG. 8

HANDHELD ELECTRONIC DEVICE INCLUDING APPOINTMENT AND MEETING CONFLICT NOTIFICATION, AND ASSOCIATED METHOD

BACKGROUND OF THE INVENTION

1. Field of the Invention

The invention relates generally to handheld electronic devices and, more particularly, to a handheld electronic device having an improved calendar application for managing appointments and meetings that automatically checks for and notifies the user of scheduling conflicts with new appointments and meetings. The invention also relates to a method of managing appointments and meetings in a handheld electronic device that includes automatic conflict notification.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

A typical calendar application provided on a handheld electronic device enables the user to, among other things, track and manage appointments and meetings and set reminders for various events and/or tasks. Specifically, users are able to enter particular appointments and meetings, including, for example, information such as the day, time, duration and location thereof. This information is saved and may be selectively manipulated and displayed to the user in various known formats, such as in monthly, weekly or daily views. In addition, users are also typically able to both invite other individuals to meetings and be invited to meetings by other individuals using the wireless communication capability of the handheld electronic device (invitations are typically sent and received using email messages). In the former case, the particular invitees are specified by the user at the time the new meeting is entered.

Typically, new appointments and meetings may be entered into a handheld electronic device by a user through a subroutine of the calendar application the enables the user to enter the relevant information. Similarly, another subroutine of the calendar application enables a user to accept or reject meeting invitations received from third parties, with appropriate information for accepted meetings being saved. For obvious reasons, a user will want to avoid scheduling new appointments or meetings that directly conflict with or are located too close in time with previously scheduled appointments or meetings.

Some prior art calendar applications utilized by non-handheld computing devices, such as a personal computer, include functionality wherein the entire database of calendar information maintained thereby is searched each time a new appointment or meeting is entered in order to determine whether conflicts exist. An example of such an application is the calendar application forming a part of the Outlook software application sold by Microsoft Corporation. However, due to memory and processing constraints present in most handheld electronic devices, it is not possible or practical to search the entire database of calendar entries each time a new appointment or meeting is to be entered. Thus, with current known handheld electronic devices, if a user wants to avoid scheduling new appointments or meetings (including those to which they are invited by third parties) that directly conflict with or are located too close in time with previously scheduled appointments or meetings, the user must manually check the calendar maintained by the calendar application for conflicts, either before, during, or after the steps of creating a new appointment. This will typically require the user to navigate through various different parts of the calendar application. These steps, while ultimately achieving the purpose of checking for conflicts, are inconvenient and time consuming. Thus, there is a need for a handheld electronic device that will automatically check for previously scheduled appointments or meetings that directly conflict with or are located too close in time with proposed new appointments or meetings.

SUMMARY OF THE INVENTION

An improved handheld electronic device and an associated method provide an improved calendar application for managing appointments and meetings that automatically checks for and notifies the user of scheduling conflicts with new appointments and meetings. As a result, users no longer need to manually check their existing calendar for conflicts before entering or accepting an appointment or meeting.

These and other aspects of the invention are provided by a method of checking a new calendar entry in a calendar application that has a plurality of existing calendar entries and an associated calendar cache, wherein the calendar cache includes a first subset of the existing calendar entries falling within a first date range. The method includes steps of receiving information relating to the new calendar entry including at least one of a date, a start time and an end time of the new calendar entry and determining whether the date falls within the first date range of the calendar cache. If the date does fall within the first date range, the method includes: (i) examining the calendar cache and determining whether the new calendar entry directly conflicts with one of the existing calendar entries in the first subset of the existing calendar entries, and (ii) providing a conflict notification if the new calendar entry is directly conflicting. If, however, the date falls outside of the first date range, the method includes: (i) creating a new calendar cache including a second subset of the existing calendar entries falling within a second date range that covers a predetermined time period including, and preferably before and after, the date of the new calendar entry, (ii) examining the new calendar cache and determining whether the new calendar entry directly conflicts with one of the existing calendar entries in the second subset of the existing calendar entries, and (iii) providing a conflict notification if the new calendar entry is directly conflicting.

The step of examining the calendar cache may also include determining whether the new calendar entry is adjacent to one of the existing calendar entries in the first subset, in which case an adjacency notification is provided. In addition, the step of examining the new calendar cache may also include determining whether the new calendar entry is adjacent to one of the existing calendar entries in the second subset, in which case an adjacency notification is provided.

The new calendar entry may be based on a received meeting invitation or on a new appointment or meeting input by a user. The new calendar entry may also be one of a series of recurring new calendar entries, in which case the method may include repeating the steps described above for a predetermined number of the recurring new calendar entries, wherein, in each case, one of the predetermined number of recurring new calendar entries is treated as the new calendar entry.

According to another aspect of the invention, an electronic device, such as a handheld electronic device, is provided that includes a display, a processor, and a memory having a calendar application having a plurality of existing calendar entries. The calendar application has a calendar cache associated therewith that includes a first subset of the existing calendar entries falling within a first date range. The memory stores one or more routines executable by the processor that are adapted to perform the various embodiments of the method described above.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
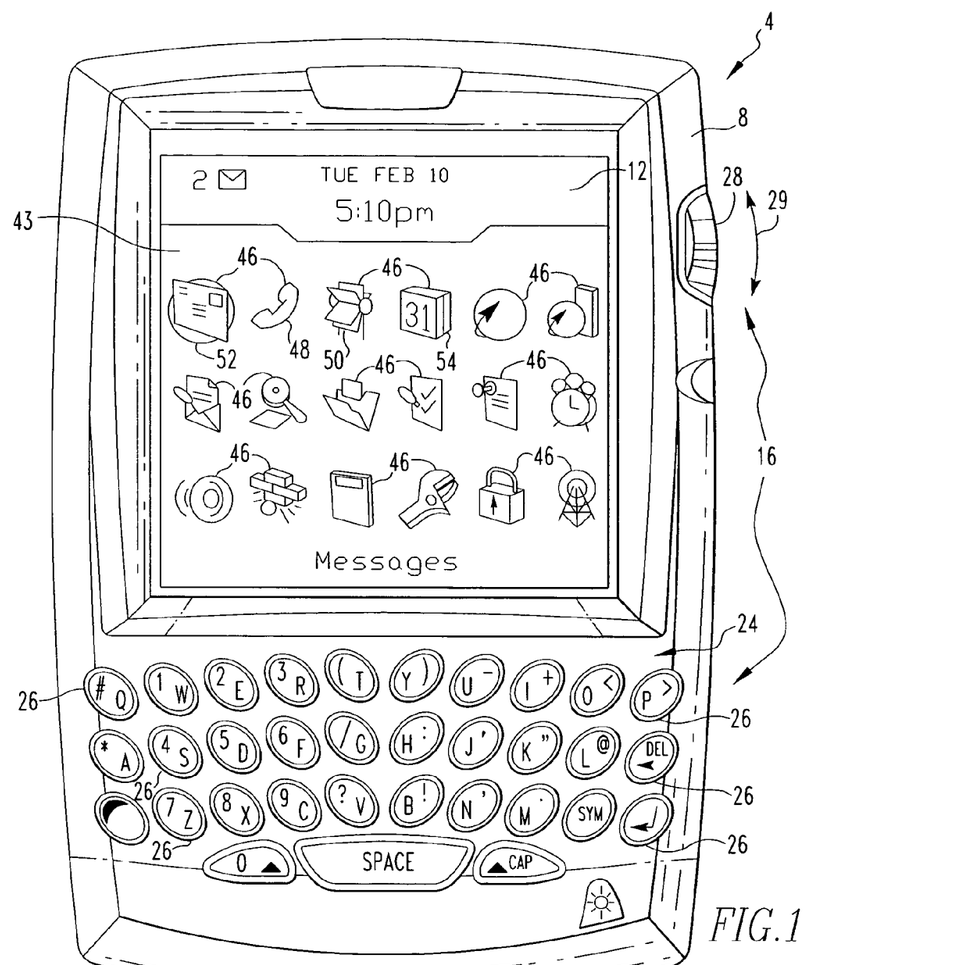
FIG. 1 is a front view of an improved handheld electronic device in accordance with the invention.
Figure 2:
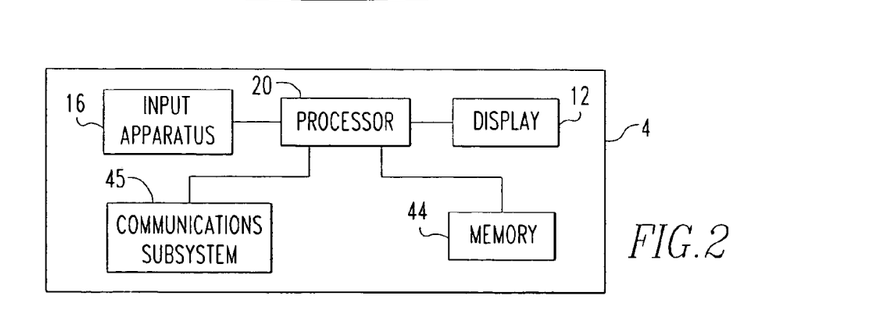
FIG. 2 is a block diagram of the handheld electronic device of FIG. 1.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. While for clarity of disclosure reference has been made herein to the exemplary display 12 for displaying various types of information, it will be appreciated that such information may be stored, printed on hard copy, be computer modified, or be combined with other data, and all such processing shall be deemed to fall within the terms "display" or "displaying" as employed herein. Examples of handheld electronic devices are included in U.S. Pat. Nos. 6,452,588 and 6,489,950, which are incorporated by reference herein. The handheld electronic device 4 is of a type that includes a calendar application and, as will be described in greater detail below, provides automatic checking for and notification of previously scheduled appointments or meetings that directly conflict with or are located too close in time with proposed new appointments or meetings.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. As used herein, the expression "function" and variations thereof can refer to any type of process, task, procedure, routine, subroutine, function call, or other type of software or firmware operation that can be performed by the processor 20 of the handheld electronic device 4.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

As is also shown in FIG. 2, processor 20 is in electronic communication with communications subsystem 45. Communications functions for handheld electronic device 4, including data and voice communications, are performed through communications subsystem 45. Communications subsystem 45 includes a transmitter and a receiver (possibly combined in a single transceiver component) and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobiltex™, DataTAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4. Together, processor 20, memory 44 and communications subsystem 45 may, along with other components (having various types of functionality), be referred to as a processing unit.

In FIG. 1, the display 12 is depicted as displaying a home screen 43 that includes a number of applications depicted as discrete icons 46, including an icon representing a phone application 48, an address book application 50, a messaging application 52 which includes email, SMS and MMS applications, and a calendar application 54.

In FIG. 1, the home screen 43 is currently active and would constitute a portion of an application. Other applications, such as phone application 48, address book application 50, messaging application 52, and calendar application 54 can be initiated from the home screen 43 by providing an input through the input apparatus 16, such as by rotating the thumbwheel 28 and providing a selection input by translating the thumbwheel 28 in the direction indicated by the arrow 29 in FIG. 1.

According to an aspect of the invention, calendar application 54 includes a subroutine, executable by processor 20, that maintains and updates a cache of calendar information. As is known, cache refers to a section of a computing device's memory which retains certain data in order to speed up repeated access to the same data. The cache maintained by calendar application 54 consists of a predefined subset of the existing entries of calendar application 54. The predefined subset consists of all existing entries of calendar application 54, including instances of recurring entries such as weekly meetings, within a predetermined time period, such as two months, before and after a particular date. According to the invention, the calendar cache is created each time the user activates calendar application 54, in which case the cache is created around the then current date. The calendar cache is also updated each time (i) a calendar entry is added and/or modified by the user, and (ii) the calendar entry in question has a date associated with it that falls outside of the current calendar cache date range. In such a case, the cache is updated (re-created) around the date associated with the entry in question. For example, if a user activates calendar application 54 on Oct. 1, 2004, calendar application 54 will create a cache consisting of the existing entries of calendar application 54 that are a within a predetermined time period, say two months in this example, before and after Oct. 1, 2004. If a user subsequently enters a new appointment for Oct. 10, 2004, the cache will not be recreated around Oct. 10, 2004 because that date falls within the current cache date range. If, however, a user subsequently enters a new appointment for Dec. 10, 2004, the cache will be recreated around Dec. 10, 2004 because that date falls outside of the current cache date range. As described below, this calendar cache is used in the invention to facilitate the automatic checking of calendar entries for previously scheduled appointments or meetings that directly conflict with or are located too close in time with proposed new appointments or meetings. The calendar cache obviates the need to search the entire database of existing calendar entries.

Figure 3:
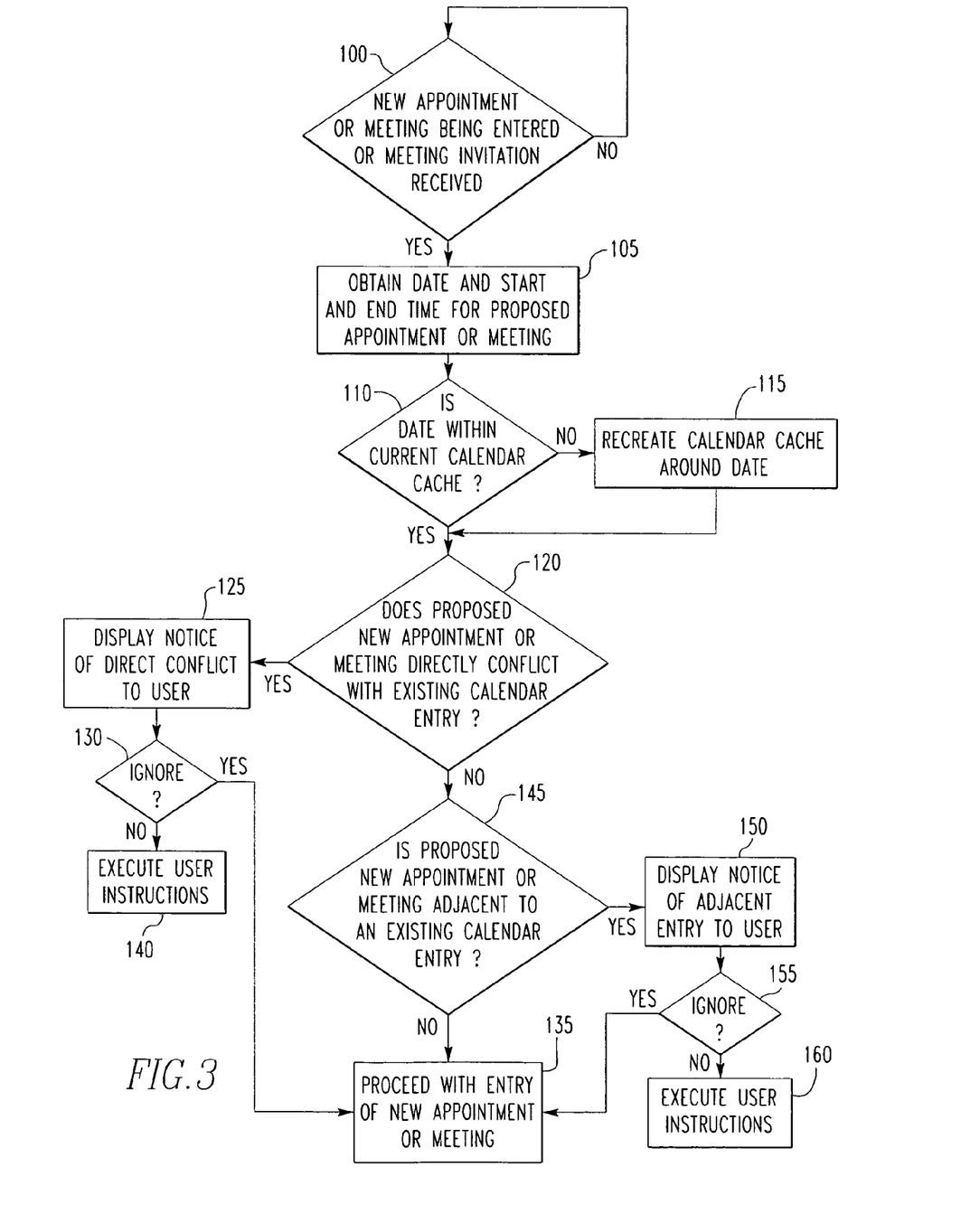
FIG. 3 is a flowchart depicting a routine executed by the processor of the handheld electronic device of FIGS. 1 and 2 for automatically checking for and providing notification of previously scheduled appointments or meetings that directly conflict with or are located too close in time with proposed new appointments or meetings.
Figure 4:
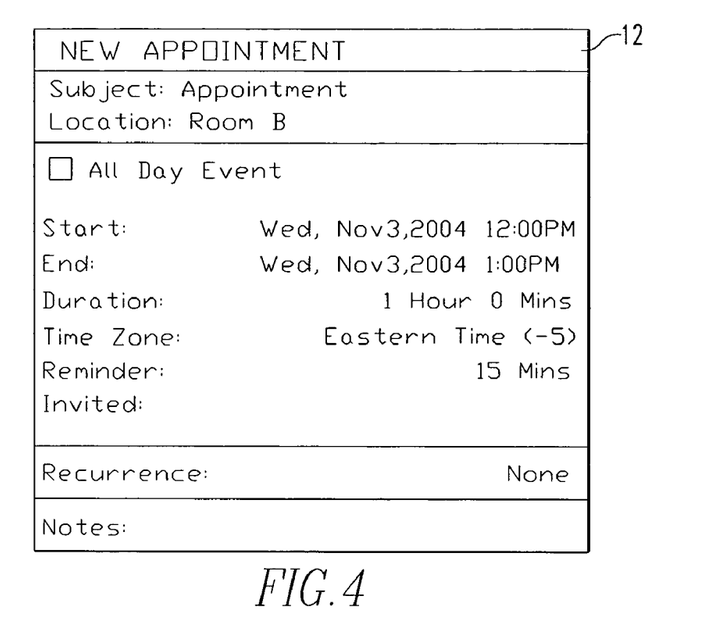
FIGS. 4, 5, 6, 7 and 8 are exemplary views of a portion of the display of the handheld electronic device of FIGS. 1 and 2 according to the invention.
Figure 5:
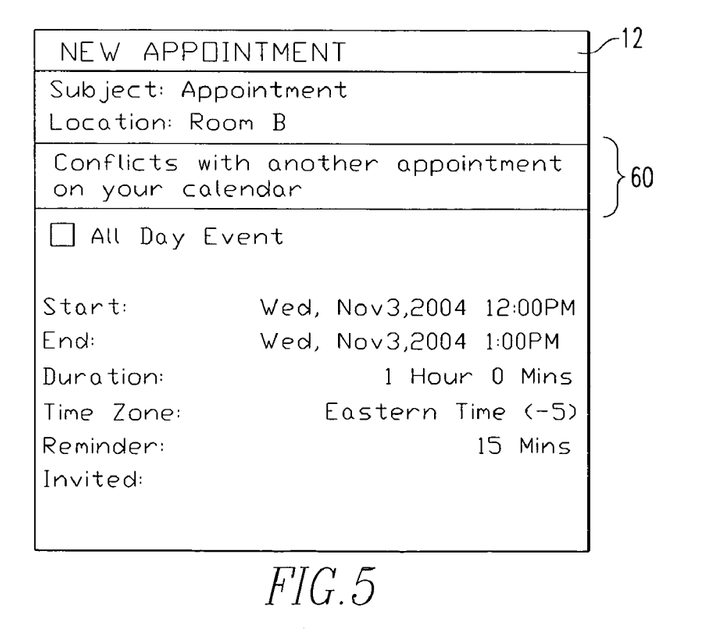
Figure 6:
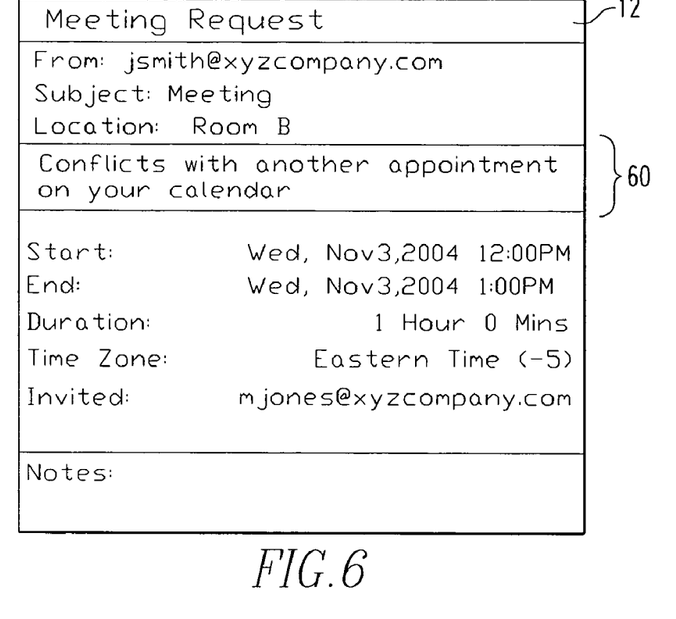

A flowchart depicting a routine performed by processor 20 for automatically checking for and providing notification of previously scheduled appointments or meetings that directly conflict with or are located too close in time with proposed new appointments or meetings according to the invention is shown in FIG. 3. Preferably, the routine of FIG. 3 is initiated when a user of handheld electronic device 4 either utilizes calendar application 54 to enter a new appointment or schedule and enter a meeting with one or more other individuals or receives an invitation for a meeting from another individual. FIG. 4 is an exemplary depiction of display 12 showing a "New Appointment" screen generated by calendar application 54 that enables a user to enter and schedule a new appointment or meeting. As seen in FIG. 4, the "New Appointment" screen includes a number of fields for entry of information relating to the proposed new appointment or meeting, including, among other things, the subject, location, and start and end dates and times of the new appointment or meeting. The user may selectively enter this information using input apparatus 16. In the particular embodiment of the invention shown in FIGS. 4, 5 and 6, new appointments and meetings are entered in a similar fashion using the "New Appointment" screen, as "appointments" are scheduled amounts of time in the calendar of calendar application 54 and "meetings" are "appointments" to which other individuals are invited. Thus, the "New Appointment" screen includes a field for entering invitees for a new meeting, preferably by entering an email address for each invitee. It will be appreciated, however, that the embodiment shown in FIGS. 4, 5 and 6 is meant to be exemplary only and that the entry of appointments and meetings may be handled separately by different portions of calendar application 54 without departing from the scope of the present invention.

Referring again to FIG. 3, the method begins at 100, where a determination is made as to whether either: (1) a user is taking steps to enter and schedule a new appointment or meeting using handheld electronic device 4 as described above, or (2) an invitation to a new meeting has been received by handheld electronic device 4 from a third party. If the answer is no, the method returns to 100 and awaits one of these events. If the answer is yes, then, at 105, the date and start and end time of the proposed new appointment or meeting is obtained. For new appointments or meetings entered by the user of handheld electronic device 4, this information is known because, in the preferred embodiment, new appointments and meetings may be entered and the "New Appointment" screen may be initiated by first selecting the desired date in the calendar of the calendar application using input apparatus 16, and then selecting a "New Appointment" entry from a menu displayed on display 12. This information may also be obtained from the completed fields of the "New Appointment" screen shown in FIG. 4. In the case of meeting invitations, this information is obtained from the meeting invitation message.

Next, at 110, a determination is made as to whether the date of the proposed new appointment or meeting falls within the date range covered by the current calendar cache maintained by calendar application 54. If the answer is no, then, at 1115, calendar application 54 recreates the calendar cache around the date of the proposed new appointment or meeting, and the method proceeds to 120. If, however, the answer at 110 is yes, the method proceeds directly to 120.

At 120, a determination is made as to whether the proposed new appointment or meeting directly conflicts with one or more existing entries of calendar application 54. Specifically, the date and start and end time of the proposed new appointment or meeting is compared to the existing entries of calendar application 54 that are contained in the then current calendar cache to determine whether there are any existing entries that have a date and start and end time that overlaps in any respect with the date and start and end time of the proposed new appointment or meeting. If the answer at 120 is yes, then, at 125, a message is displayed on display 12 notifying the user of the fact that the proposed new appointment or meeting directly conflicts with one or more existing entries of calendar application 54. FIG. 5 is an exemplary depiction of display 12 showing the "New Appointment" screen generated by calendar application 54 which includes a notification message 60, generated at 125, that notifies the user of a direct conflict. FIG. 6 is an exemplary depiction of display 12 showing a "Meeting Invitation" screen generated by calendar application 54 that notifies a user of an invitation to a meeting sent to the user by a third party. As seen in FIG. 6, the "Meeting Invitation" screen includes a notification message 60, generated at 125, that notifies the user of a direct conflict.

Next, at 130, a determination is made as to whether the user wishes to ignore the direct conflict and schedule the proposed new appointment or meeting. If the answer is yes, then, at 135, the proposed new appointment or meeting is entered into calendar application 54 (and saved in memory 44) notwithstanding the direct conflict, which will result in overlapping entries for the date and times in question. As will be appreciated, where the method of FIG. 3 is initiated in response to receipt of a meeting invitation from a third party, the step at 135 will include sending an appropriate acceptance response, such as by email, to the inviting third party. If the answer at 130 is no, however, then, at 140, the user provides instructions for proceeding within calendar application 54 by inputting and/or selecting appropriate information using input apparatus 16. Such instructions may include, without limitation, aborting the entry of the proposed new appointment or meeting in light of the direct conflict by exiting the new appointment or meeting subroutine of calendar application 54 (such as by selecting an appropriate entry from a menu displayed on display 12) or rejecting a meeting invitation received from a third party (in which case an appropriate message, preferably via email, is sent to the inviting third party).

Figure 7:
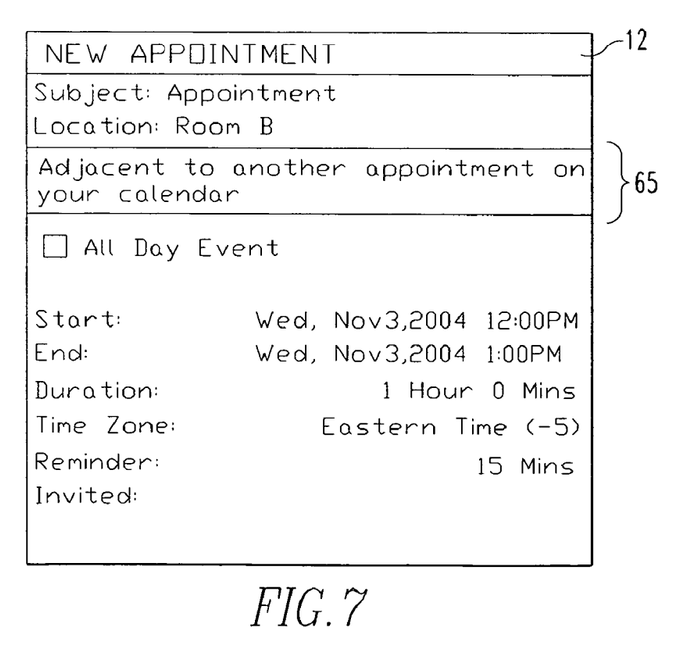
Figure 8:
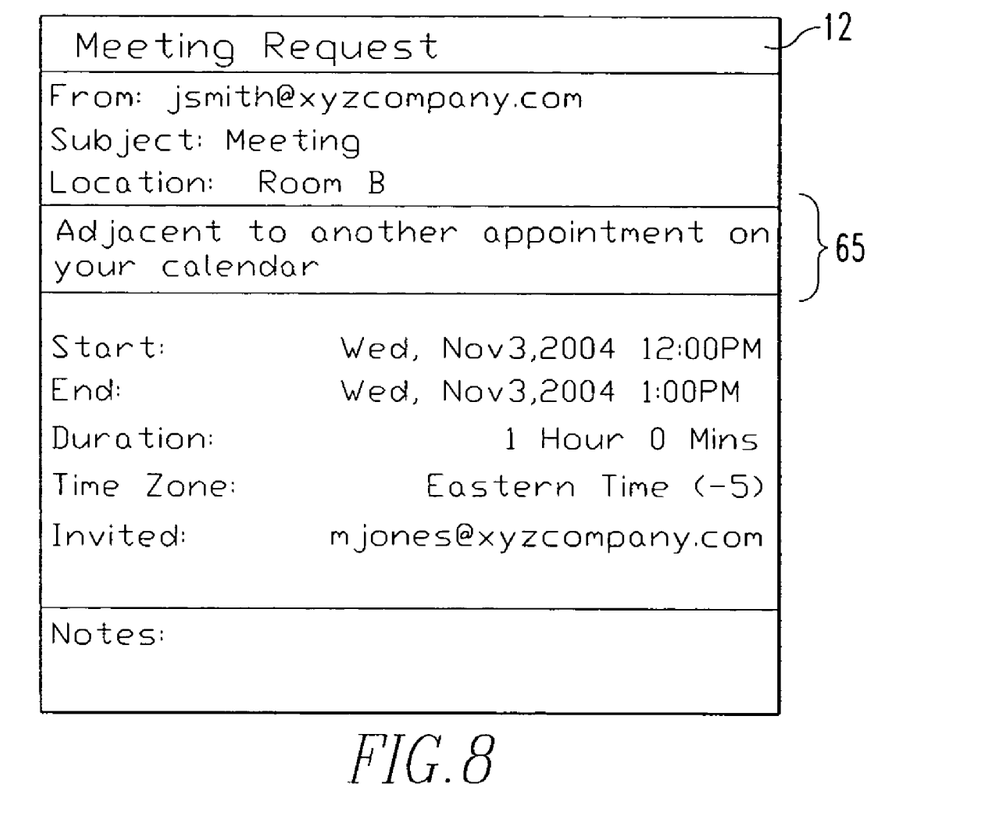

If the answer at 120 is no, meaning there is no direct conflict, then, at 145, a determination is made as to whether the proposed new appointment or meeting is adjacent to one or more existing entries of calendar application 54. Specifically, the date and start and end time of the proposed new appointment or meeting is compared to the existing entries of calendar application 54 that are contained in the then current calendar cache to determine whether there are any existing entries that have the same date as the proposed new appointment or meeting and a start time or an end time that is within a predetermined time period, such as fifteen minutes, of the end time or start time, respectively, of the proposed new appointment or meeting. If it is determined that the current calendar cache has an existing entry that has the same date as the proposed new appointment or meeting and a start time or an end time that is within a predetermined time period of the end time or start time, respectively, of the proposed new appointment or meeting then, as used herein, the proposed new appointment or meeting is said to be "adjacent to" an existing entry. This will allow a user to gauge whether there is sufficient time between the proposed new appointment or meeting and the existing calendar entry to make scheduling of the proposed new appointment or meeting feasible. Preferably, the predetermined time period may be selectively adjusted by the user as he or she sees fit. If the answer at 145 is yes, then, at 150, a message is displayed on display 12 notifying the user of the fact that the proposed new appointment or meeting is adjacent to one or more existing entries of calendar application 54. FIG. 7 is an exemplary depiction of display 12 showing the "New Appointment" screen generated by calendar application 54 which includes a notification message 65, generated at 150, that notifies the user of the fact that adjacent pre-existing entries are present. FIG. 8 is an exemplary depiction of display 12 showing a "Meeting Invitation" screen generated by calendar application 54 that notifies a user of an invitation to a meeting sent to the user by a third party. As seen in FIG. 8, the "Meeting Invitation" screen includes a notification message 65, generated at 150, that notifies the user of the fact that adjacent pre-existing entries are present.

Next, at 155, a determination is made as to whether the user wishes to ignore the fact that adjacent pre-existing entries are present and schedule the proposed new appointment or meeting. If the answer is yes, then, at 135, the proposed new appointment or meeting is entered into calendar application 54 (and saved in memory 44). As will be appreciated, where the method of FIG. 3 is initiated in response to receipt of a meeting invitation from a third party, the step at 135 will include sending an appropriate acceptance response, preferably via email, to the inviting third party. If the answer at 155 is no, however, then, at 160, the user provides instructions for proceeding within calendar application 54 by inputting and/or selecting appropriate information using input apparatus 16. Such instructions may include, without limitation, aborting the entry of the proposed new appointment or meeting in light of the adjacent pre-existing entry by exiting the new appointment or meeting subroutine of calendar application 54 (such as by selecting an appropriate entry from a menu displayed on display 12) or rejecting a meeting invitation received from a third party (in which case an appropriate message, preferably via email, is sent to the inviting third party).

As is known, appointments or meetings that are entered into calendar application 54 may be periodically recurring appointments or meetings. For example, a user may have a weekly staff meeting that he or she wishes to enter into calendar application 54. The method shown in FIG. 3 may be used to determine whether any particular appointment or meeting in a proposed series of recurring appointments or meetings directly conflicts with or is located too close in time to an existing calendar entry. However, as will be appreciated, it will not be possible to check all of the particular appointments or meetings in a series of recurring appointments or meetings that continue indefinitely. Thus, according to an aspect of the invention, for proposed recurring appointments or meetings, only the appointments or meetings thereof that fall within a predetermined subsequent time frame are checked using the method shown in FIG. 3. For example, for a proposed weekly meeting that extends indefinitely, the calendar application may only check the proposed weekly meeting for the first two months. Furthermore, in this embodiment, the notification messages 60, 65 may indicate which of the recurring appointments or meetings conflict with or are located too close in time to another entry, or, alternatively, may simply indicate the number of such appointments or meetings that conflict with or are located too close in time to another entry.

Thus, the invention provides a handheld electronic device having functionality for automatically checking for and providing notification of previously scheduled appointments or meetings that directly conflict with or are located too close in time with proposed new appointments or meetings. In this manner, the user is able to more easily and efficiently manage his or her schedule as maintained by the calendar application of the handheld electronic device.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of checking a new calendar entry in a calendar application having a plurality of existing calendar entries, said calendar application having a calendar cache associated therewith, said calendar cache including a first subset of said existing calendar entries falling within a first date range, the method comprising steps of:

receiving information relating to said new calendar entry, said information including a date, a start time and an end time of said new calendar entry;

determining whether said date falls within said first date range of said calendar cache;

if said date falls within said first date range: (i) examining said calendar cache and determining whether said new calendar entry directly conflicts with one of said existing calendar entries in said first subset of said existing calendar entries using said information, and (ii) providing a conflict notification if said new calendar entry directly conflicts with one of said existing calendar entries in said first subset of said existing calendar entries; and if said date falls outside of said first date range: (i) updating said calendar cache to create an updated calendar cache by replacing said first subset of said existing calendar entries with a second subset of said existing calendar entries falling within a second date range, said second date range covering a predetermined time period including said date, (ii) examining said updated calendar cache and determining whether said new calendar entry directly conflicts with one of said existing calendar entries in said second subset of said existing calendar entries using said information, and (iii) providing a conflict notification if said new calendar entry directly conflicts with one of said existing calendar entries in said second subset of said existing calendar entries.

2. The method according to claim 1, wherein said information includes said date, said start time and said end time, wherein said step of examining said calendar cache includes determining whether said new calendar entry is adjacent to one of said existing calendar entries in said first subset, wherein said step of providing a conflict notification if said new calendar entry directly conflicts with one of said existing calendar entries in said first subset includes providing an adjacency notification if said new calendar entry is adjacent to one of said existing calendar entries in said first subset, wherein said step of examining said updated calendar cache includes determining whether said new calendar entry is adjacent to one of said existing calendar entries in said second subset, and wherein said step of providing a conflict notification if said new calendar entry directly conflicts with one of said existing calendar entries in said second subset includes providing an adjacency notification if said new calendar entry is adjacent to one of said existing calendar entries in said second subset.

3. The method according to claim 1, wherein said new calendar entry is based on a received meeting invitation.

4. The method according to claim 1, wherein said new calendar entry is based on a new appointment or meeting input by a user.

5. The method according to claim 1, wherein said new calendar entry is one of a series of recurring new calendar entries, the method including repeating the steps of claim 1 for a predetermined number of said recurring new calendar entries, in each case one of said predetermined number of said recurring new calendar entries being treated as said new calendar entry.

6. The method according to claim 2, wherein said new calendar entry is one of a series of recurring new calendar entries, the method including repeating the steps of claim 2 for a predetermined number of said recurring new calendar entries, in each case one of said predetermined number of said recurring new calendar entries being treated as said new calendar entry.

7. The method according to claim 1, wherein said predetermined time period is a predetermined time period before and after said date.

8. An electronic device having a calendar application, comprising:
 a display;
 a processor; and
 a memory storing a plurality of existing calendar entries of said calendar application, said calendar application having a calendar cache associated therewith, said calendar cache including a first subset of said existing calendar entries falling within a first date range, said memory storing one or more routines executable by said processor, said one or more routines being adapted to:
 (a) receive information relating to a new calendar entry, said information including a date, a start time and an end time of said new calendar entry;
 (b) determine whether said date falls within said first date range of said calendar cache;
 (c) if said date falls within said first date range: (i) examine said calendar cache and determine whether said new calendar entry directly conflicts with one of said existing calendar entries in said first subset of said existing calendar entries using said information, and (ii) provide a conflict notification on said display if said new calendar entry directly conflicts with one of said existing calendar entries in said first subset of said existing calendar entries; and
 (d) if said date falls outside of said first date range: (i) update said calendar cache to create an updated calendar cache by replacing said first subset of said existing calendar entries with a second subset of said existing calendar entries falling within a second date range, said second date range covering a predetermined time period including said date, (ii) examine said updated calendar cache and determine whether said new calendar entry directly conflicts with one of said existing calendar entries in said second subset of said existing calendar entries using said information, and (iii) provide a conflict notification on said display if said new calendar entry directly conflicts with one of said existing calendar entries in said second subset of said existing calendar entries.

9. The electronic device according to claim 8, wherein said information includes said date, said start time and said end time, wherein said one or more routines are further adapted to:
 (i) if said date falls within said first date range, determine whether said new calendar entry is adjacent to one of said existing calendar entries in said first subset and provide an adjacency notification on said display if said new calendar entry is adjacent to one of said existing calendar entries in said first subset, and (ii) if said date falls outside of said first date range, determine whether said new calendar entry is adjacent to one of said existing calendar entries in said second subset and provide an adjacency notification on said display if said new calendar entry is adjacent to one of said existing calendar entries in said second subset.

10. The electronic device according to claim 9, wherein said electronic device is a handheld electronic device.

11. The electronic device according to claim 8, wherein said electronic device is a handheld electronic device.

12. The electronic device according to claim 8, wherein said new calendar entry is based on a meeting invitation received by said electronic device.

13. The electronic device according to claim 8, wherein said new calendar entry is based on a new appointment or meeting input into said electronic device.

14. The electronic device according to claim 8, wherein said new calendar entry is one of a series of recurring new calendar entries, said one or more routines being further adapted to repeat (a) through (d) of claim 7 for a predetermined number of said recurring new calendar entries, in each case one of said predetermined number of said recurring new calendar entries being treated as said new calendar entry.

15. The electronic device according to claim 9, wherein said new calendar entry is one of a series of recurring new calendar entries, said one or more routines being further adapted to repeat (a) through (d) of claim 7 and (i) and (ii) of claim 8 for a predetermined number of said recurring new calendar entries, in each case one of said predetermined number of said recurring new calendar entries being treated as said new calendar entry.

16. The electronic device according to claim 8, wherein said predetermined time period is a predetermined time period before and after said date.

* * * * *

UNITED STATES PATENT AND TRADEMARK OFFICE
CERTIFICATE OF CORRECTION

| | | |
|---|---|---|
| PATENT NO. | : 7,519,924 B2 | Page 1 of 1 |
| APPLICATION NO. | : 10/980402 | |
| DATED | : April 14, 2009 | |
| INVENTOR(S) | : Andrew D. Bocking et al. | |

It is certified that error appears in the above-identified patent and that said Letters Patent is hereby corrected as shown below:

Column 1, line 56, delete "the enables" and insert therefor -- that enables --;

Column 4, line 6, delete "thum-" and insert therefor -- thumb- --;

Column 4, line 7, delete "bwheel" and insert therefor -- wheel --;

Column 4, line 64, delete "thum-" and insert therefor -- thumb- --;

Column 4, line 65, delete "bwheel" and insert therefor -- wheel --;

Column 5, line 24, delete "are a" and insert therefor -- are --;

Column 6, line 29, delete "1115" and insert therefor -- 115 --.

Signed and Sealed this
Sixth Day of December, 2011

David J. Kappos
*Director of the United States Patent and Trademark Office*